United States Patent Office 3,355,512
Patented Nov. 28, 1967

3,355,512
PROCESS FOR CURING POLYEPOXIDES WITH THE REACTION PRODUCT OF H₂S AND TRI OR POLY FUNCTIONAL POLYEPOXIDES
William De Acetis, Berkeley, and Herbert A. Newey, Lafayette, Calif., assignors to Shell Oil Company, New York, N.Y., a corporation of Delaware
No Drawing. Continuation of application Ser. No. 289,429, June 20, 1963. This application Dec. 8, 1966, Ser. No. 600,262
13 Claims. (Cl. 260—830)

ABSTRACT OF THE DISCLOSURE

Polyepoxides are cured into insoluble, infusible materials by reacting them with polymercaptans. The polymercaptans are prepared by the reaction of hydrogen sulfide and a polyepoxide having at least 3 vic-epoxy groups.

---

This invention relates to a process for curing polyepoxides. More particularly, the invention relates to a new process for curing polyepoxides at a fast rate using a special class of polymercaptans.

This application is a continuation-of-application Ser. No. 289,429, filed June 20, 1963, now abandoned.

Specifically, the invention provides a new and highly efficient process for curing polyepoxides at a fast rate at low temperatures to yield products having improved properties. This process comprises mixing and reacting the polyepoxides with an adduct of hydrogen sulfide and a polyepoxide having more than 2 epoxy groups, preferably in the presence of an accelerator for the epoxy-mercaptan reaction, such as a tertiary amine. The invention further provides new and improved products prepared by this process.

Polyepoxides, such as, for example, those obtained by reacting epichlorohydrin with polyhydric phenols in the presence of caustic, are promising materials for use in many industrial applications as they can be reacted with curing agents to form insoluble infusible products having good chemical resistance. The conventional polyepoxide-curing agent systems, however, have certain drawbacks that have limited their use for certain applications. For example, the known systems take considerable time to cure at low temperatures. With the aliphatic type amine curing agents, the systems take several hours to set to a hard product at these temperatures. Because of this, it has been difficult to use the polyepoxide systems for applications, such as highway coatings, maintenance surface coatings and the like, where the coating must dry in a very short time.

It is, therefore, an object of the invention to provide a new process for curing polyepoxides. It is a further object to provide a new process for curing polyepoxides that brings about a fast cure at low temperatures. It is a further object to provide a new process for preparing rapid setting polyepoxide surface coatings. It is a further object to provide new curing agents for polyepoxides that react rapidly to give improved products. It is a further object to provide new epoxy compositions which may be used as coatings, caulking compounds, adhesives for concrete, encapsulating agents and the like. It is a further object to provide new cured polyepoxides having good solvent, water, and heat resistance. These and other objects of the invention will be apparent from the following detailed description thereof.

It has new been discovered that these and other objects may be accomplished by the new process of the invention which comprises mixing and reacting the polyepoxide with an adduct of hydrogen sulfide and a polyepoxide having more than 2 epoxy groups, preferably in the presence of an accelerator for the epoxy-mercaptan reaction, such as a tertiary amine. It has been surprisingly found that these particular compounds are especially effective for the cure of polyepoxides, and particularly those having two epoxy groups, when used at the lower reaction temperatures, e.g., from 10° C. to about 30° C., and preferably when used in combination with accelerators as described hereinafter. Furthermore, the cured products are hard and tough and have excellent resistance to solvents and heat.

The new curing agents used in the process of the invention comprise the adducts obtained by reacting hydrogen sulfide with polyepoxides having more than 2 epoxy groups. Examples of such polyepoxides include, among others, glycidyl ethers of polyhydric alcohols containing at least three OH groups, such as glycerol, 1,2,6-hexanetriol, pentaerythritol, polyvinyl alcohol, polyallyl alcohol, 1,3,5-pentanetriol, polyols obtained by reacting trihydric or higher alcohols with dibasic acids, polyols obtained by hydration of polyepoxides containing two or more epoxy groups, polyols obtained by homopolymerizing and copolymerizing vinyl or allylic monomers containing OH groups, such as hydroxyethyl acrylate and the like.

Other examples of polyepoxides possessing more than 2 epoxy groups include the glycidyl ethers of polyhydric phenols containing at least three OH groups, such as, for example, 1,3,5-trihydroxybenzene, 2,2-bis(4,6-dihydroxyphenyl)propane, 2,2-bis(4,6-dihydroxyphenyl)sulfone, and 1,3,5-trihydroxynaphthalene, and polyhydric phenols obtained by reacting phenols with formaldehyde (novolac resins), such as represented by the formula

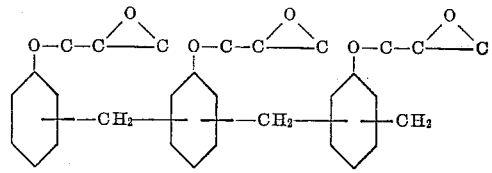

The preparation of these polyepoxides is illustrated in U.S. 2,216,099 and U.S. 2,658,885.

Another group of polyepoxides possessing more than 2 epoxy groups to be reacted with the hydrogen sulfide include, among others, those esters of epoxy alcohols and polycarboxylic acids containing at least three carboxyl groups, and alternatively, those esters of epoxy acids and polyhydric alcohols or phenols containing at least three OH groups. Examples of such esters include, among others, triglycidyl ester of 1,2,4-butanetricarboxylic acid, triglycidyl ester of 1,3,6-hexanetricarboxylic acid, triglycidyl ester of trimellitic acid, glycidyl ester of poly-(acrylic acid), glycidyl esters of poly(methacrylic acid), glycidyl ester of pyromellitic acid, and ester of 2,3-epoxypropionic acid and 1,2,6-hexanetriol, ester of 2,3-epoxypropionic acid and glycerol, esters of 3,4-epoxybutanoic acid and polyvinyl alcohol and the like.

The highly functional mercaptan products are obtained by reacting the above-noted polyepoxides with hydrogen sulfide. The amount of the hydrogen sulfide to be employed may vary, but it is preferred to use an excess of the hydrogen sulfide. For best results it is preferred to add the polyepoxide and hydrogen sulfide in mol ratios of 1:20 to 1:4, and more preferably from 1:10 to 1:3. The reaction between the polyepoxide and hydrogen sulfide is preferably accomplished in the presence of catalysts, such as alkaline materials as sodium hydrosulfide, sodium ethoxide, sodium phenoxide and the like, or small amount of amine compounds, such as diethyl amine, melamine and the like. The amount of catalyst employed may vary from about .001% to about 5% by weight. The temperature employed in the reaction may vary over a wide range. In some instances, it may proceed at low temperatures such as —15° C., to room temperatures. Preferred temperatures range from about 20° C. to 100° C. At the completion of the reaction, the polymercaptan can be recovered by any suitable means, such as distillation, extraction, filtration and the like.

Illustration of the above method for making highly functional polymercaptans is given below for the reaction of a glycidyl ether of a novolac resin with hydrogen sulfide:

1500 parts of a glycidyl ether of a phenol-formaldehyde resin having a molecular weight between 550–650 and an epoxy value of 0.56 20 eq./100 g. was dissolved in 3000 parts of dioxane and this mixture added with stirring over a 5 day interval to a flask containing a mixture of 12 parts of NaHS, 3000 parts of dioxane and 3000 parts of ethanol, which mixture had been staurated with hydrogen sulfide. The hydrogen sulfide saturation and stirring was continued for the 5 days and 1 additional day. At the end of that time, the catalyst was deactivated by the addition of an acid ion exchange resin (to drop to pH of 5 to 6). The mixture was filtered and solvents removed on steam batch at 1 mm. and 70° C. Product was a viscous organe oil. Total sulfur 14.6%, theory 15.2%, —SH 0.45, theory 0.47.

The polyepoxides cured by the above-described agents comprise those compounds possessing more than one and preferably 2 vicinal epoxy groups, i.e.,

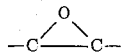

groups. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides to be cured by the above-described agents, and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower rapeseed, hempseed, sardine, cottonseed oil and the like.

Another group of the epoxy-containing materials used in the process of the invention include the epoxidized esters of unsaturated monohydric alcohols and polycarboxylic acids, such as, for example, di(2,3-epoxybutyl) adipate,
di(2,3,-epoxybutyl) oxalate,
di(2,3-epoxyhexyl) succinate,
di(3,4-epoxybutyl) maleate,
di(2,3-epoxyoctyl) pimelate,
di(2,3-epoxybutyl) phthalate,
di(2,3-epoxyoctyl) tetrahydrophthalate,
di(4,5-epoxydodecyl) maleate,
di(2,3-epoxybutyl) terephthalate,
di(2,3-epoxypentyl) thiodipropionate,
di(5,6-epoxytetradecyl) diphenyldicarboxylate,
di(3,4-epoxyheptyl) sulfonyldibutyrate,
tri(2,3-epoxybutyl) 1,2,4-butanetricarboxylate,
di(5,6-epoxypentadecyl) tartarate,
di(4,5-epoxytetradecyl) maleate,
di(2,3-epoxybutyl) azelate,
di(3,4-epoxybutyl) citrate,
di(5,6-epoxyoctyl) cyclohexane 1,2-dicarboxylate,
di(4,5-epoxyoctyldecyl) malonate.

Another group of the epoxy-containing materials includes those epoxidized esters of unsaturated alcohols and unsaturated carboxylic acids, such as
2,3-epoxybutyl 3,4-epoxypentanoate,
3,4-epoxphexyl 3,4-epoxyhexyl 3,4-epoxypentanoate,
3,4-epoxycyclohexyl 3,4-epoxycyclohexanoate,
3,4-epoxycyclohexyl 4,5-epoxyoctanoate,
2,3-epoxycyclohexylmethyl epoxycyclohexane carboxylate.

Still another group of the epoxy-containing materials included epoxidized derivatives of polyethylenically unsaturated polycarboxylic acids such as, for example,
dimethyl 8,9,12,13-diepoxyeicosanedioate,
dibutyl 7,8,11,12-diepoxyoctadecanedioate,
dioctyl 10,11-diethyl-8,9,12,13-diepoxy-eiconsanedioate,
dihexyl 6,7,10,11-diepoxyhexadecanedioate,
didecyl 9-epoxy-ethyl-10,11-epoxyoctadecanedioate,
dibutyl 3-butyl-3,4,5,6-diepoxycyclohexane-1,2-dicarboxylate,
dicyclohexyl 3,4,5,6-diepoxycyclohexane-1,2-dicarboxylate,
dibenzyl 1,2,4,5-diepoxycyclohexane-1,2-dicarboxylate,
and diethyl 5,6,10,11-diepoxyoctadecyl succinate.

Still another group comprises the epoxidized polyesters obtained by reacting an unsaturated polyhydric alcohol and/ or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers) butadiene-styrene copolymers and the like.

Another group comprises the glycidyl containing nitrogen compounds, such as diglycidyl aniline and di- and triglycidylamine.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in the above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.), polyglycidyl ether of 1,1,5,5-tetrakis(hydroxyphenyl) pentane (epoxy value of 0.514 eq./100 g.) and the like and mixtures thereof.

The amount of new polymercaptans to be employed in the cure of the polyepoxide may vary within certain limits. In general, the polyepoxides are combined with at least .8 equivalent of the polymercaptan. As used herein "equivalent" amount refers to that amount needed to furnish one —SH group per epoxy group to be reacted. Preferably the polymercaptans and polyepoxides are combined in chemical equivalent ratios varying from .8:1.5 to 1.5:0.8.

It is preferred in some cases to employ activators for the cure. Examples of these include, among others, phenols, sulfides, mercaptans, organic phosphines, organic arsines, organic antimony compounds, amines, amine salts or quaternary ammonium salts, etc. Preferred activators are the phenols, phosphines, arsines, amines, and sulfides, such as, for example, benzyldimethylamine dicyandiamide p,p'-bis(dimethyl-
   aminophenyl) methane,
pyridine,
dimethyl aniline,
dimethylethanolamine,
methyldiethanolamine,
morpholine,
dimethylaminopropylamine,
dibutylaminopropylamine,
stearydimethylamine,
tri-n-butyl amine,
N,N-dibutyl butylamine,
tri-n-hexylamine,
ethyl di-n-propylamine,
phenylene diamine,
diethylene triamine,
dibutyl sulfide,
dioctyl sulfide,
dicyclohexyl sulfide, and the like, and mixtures thereof. The salts may be exemplified by the inorganic and organic acid salts of the amines, such as, for example, the hydrochloride, sulfate and acetate of each of the above-described tertiary amines. The quaternary ammonium salts may be exemplified by the following:

benxyltrimethylammonium chloride,
phenyltributylammonium chloride,
cyclohexyltributylammonium sulfate,
benzyltrimethylammonium sulfate,
benzyltrimethylammonium borate,
diphenyldioctylammonium chloride, and the like, and mixtures thereof.

Preferred activators to be used are the sulfides, phosphines and tertiary amines, and more preferably the mono- and diamines wherein the amine hydrogens have been replaced by aliphatic, cycloaliphatic or aromatic hydrocarbon radicals containing not more than 15 carbon atoms, such as, for example, the trialkyl amines, triaryl amines, triarylalkylamines, alkyl arylalkylamines, tricycloalkylamines, alkyl dicycloalkylamines, diaminoalkanes, dialkylene triamines, phenylene diamines and di(aminoaryl) alkanes. Preferred amine salts are the hydrochloride, sulfate and acetate of the above-described preferred amines. The preferred quaternary salts are those of the formula

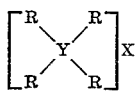

wherein Y is nitrogen, R is an alkyl, aryl or arylalkyl radical, preferably containing no more than 12 carbon atoms and X is chlorine.

The activators noted above are generally employed in amounts varying from 0.1 part to 4 parts per 100 parts of polyepoxide, and preferably from 1 part to 3 parts per 100 parts of polyepoxide.

In curing the polyepoxides, it is usually desirable to have the polyepoxide in a mobile condition when the polymercaptan is added in order to facilitate mixing. The polyepoxides, such as the glycidyl polyether of polyhydric phenols, are generally very viscous to solid materials at ordinary temperature. With those that are liquid, but too viscous for ready mixing, they are either heated to reduce the viscosity, or have a liquid solvent added thereto in order to provide fluidity. Normally solid members are likewise either melted or mixed with a liquid solvent. Various solvents are suitable for achieving fluidity of the polyepoxide. These may be volatile solvents which escape from the polyepoxide compositions containing the adduct by evaporation before or during the curing such as, esters such as ethyl acetate, butyl acetate, Cellosolve acetate (ethylene glycol monoacetate), methyl Cellosolve acetate (acetate ethylene glycol monomethyl ether), etc., ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc., and/or alcohols such as ethyl, isopropyl or n-butyl alcohol. Solvents which remain in the cured compositions may also be used, such as diethyl phthalate, dibutyl phthalate and the like, as well as cyano-substituted hydrocarbons, such as acetonitrile, propionitrile, adiponitrile, benzonitrile, and the like. It is also convenient to employ a polyepoxide, such as one of the glycidyl polyethers of the dihydric phenol, in admixture with a normally liquid glycidyl polyether of a polyhydric alcohol. In fact, two or more of any of the polyepoxides may be used together as mixtures. In such a case, the amount of the adduct added and commingled is based on the average epoxide equivalent weight of the polyepoxide mixture.

Other preferred diluents include the liquid polymercaptans, such as 1,3-dithioglycerol.

Various other ingredients may be mixed with polyepoxide subjected to cure with the novel adducts including pigments, filler dyes, plasticizers, resins, and the like.

The polyepoxides may be cured with the new polymercaptans by merely mixing the two components together, preferably in the presence of the above-noted activators. The cure time may vary from a few minutes to a few days depending on the type and quantity of reactants and presence of catalyst. In general, in the presence of activators, the cure takes place readily at room temperature. Fast reaction may be obtained, of course, by applying heat. Preferred temperatures range from about 20° C. to 200° C. With small castings, it is preferred to cure at room temperature and then post cure for a few hours at elevated temperatures, say 40° C. to 170° C.

The new compositions are particularly suited for use as surface coatings for metal, wood, concrete, and the like. In this case, the liquid solution is spread out as a thin film allowed to dry at room temperature or by application of heat.

Another important application of the use of the new polymercaptans as curing agents for polyepoxides is in the preparation of laminates or resinous particles reinforced with fibrous textiles. Although it is generally preferred to utilize glass cloth for this purpose, any of the other suitable fibrous materials in sheet form may be employed such as glass matting, paper, asbestos paper, mica flakes, cotton batts, duck muslin, canvas and the like. It is useful to prepare the laminates from woven glass cloth that has been given prior treatment with well known finishing or sizing agents therefor, such as chrome methacrylate or vinyl trichlorosilane.

In preparing the laminate, the sheets of fibrous materials are preferably first impregnated with the mixture of the polyepoxide, polymercaptan and activator. This is conveniently accomplished by dissolving the polymercaptan in a solvent and mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured by the application of heat. A plurality of the impregnated sheets can be superimposed and the assembly cured in a heated press under a pressure of about 25 to 500 or more pounds per square inch. The resulting laminate is extremely strong and resistant against the action of organic and corrosive solvents.

The new compositions of the invention are particularly outstanding adhesives. In this application they can be used as a paste or solution depending on the method of preparation as described above. Other materials may also be included in the composition, such as pigments, plasticizers, stabilizers and reinforcing fillers, such as aluminum powder, asbestos, powdered mica, zinc dust, bentonite, ground glass fibers, Moneta clay and the like. These fillers are preferably used in amounts varying from about 10 parts to 200 parts per 100 parts of the polyepoxide and polymercaptan compound. Other materials that may be included include other types of resins, such as phenol-aldehyde resins, urea-aldehyde resins, furfural resins, polyacetal resins, carbonate resins, polyamide resins, and the like.

The compositions may be used in the bonding of a great variety of different materials, such as metal-to-metal to other materials, such as plastic, wood-to-wood, glass-to-glass, glass-to-metal, and the like. They are of particular value, however, in the bonding of metals such as aluminum-to-aluminum and steel-to-steel. When applied as an adhesive, the compositions may simply be spread on the desired surface to form films of various thicknesses, e.g., 0.5 mil to 30 mils, and then the other surface superimposed and heat applied. Curing pressures can be light contact pressures up to about 500 p.s.i.

When the compositions are used as adhesives for metal-to-metal bonding, it has sometimes been found advantageous to impregnate cotton, rayon, synthetic fiber or glass cloth textiles with the compositions, and then use the impregnated textiles as a bonding tape for joining the metals. Such tapes provide convenient means for handling and using the compositions in adhesive applications. The tape is inserted between two metals desired to be joined, and the assembly is heated and baked to cure the resin whereby articles are obtained wherein the joined surfaces have not only excellent strength at ordinary temperatures, but also retain good strength even though heated at quite elevated temperatures for long periods of time. A preferred tape for such use comprises a glass fiber textile impregnated or coated with a mixture of the polyepoxide, phthalocyanine compound and atomized aluminum powder or dust.

To illustrate the manner in which the invention may be carried out the following examples are given. It is to be understood, however, that the examples are for the purpose of illustration and that the invention is not to be regarded as limited to any of the specific conditions or reactants recited therein. Unless otherwise specified parts described in the examples are parts by weight. The polyethers referred to by letter are those in U.S. 2,633,458.

EXAMPLE I

This example illustrates the use of an adduct of hydrogen sulfide and polyglycidyl ether of a phenol-aldehyde resin as a curing agent for Polyether A.

100 parts of Polyether A (diglycidyl ether of 2,2-bis(4-hydroxyphenyl)propane) was mixed with 128 parts of a hydrogen sulfide adduct of a glycidyl ether of phenol-formaldehyde resin having a mercaptan value of 0.41 eq./100 g. (produced as shown above). This mixture which contained no accelerator was casted out as a sheet and cured for 1 hour at 100° C. The resulting cured sheet had the following properties:

Heat distortion point _____ ° C__ 59.4
Flexural strength $10^{-3}$ p.s.i. _____ 16.6
Modulus $10^{-5}$ p.s.i. _____ 4.78
Tensile strength, ultimate, $10^{-3}$ p.s.i. _____ 9.6
Percent solvent pick-up, 1 month:
    Water _____ 0.93
    Benzene _____ 0.42
10% NaOH _____ 0.75
10% sulfuric acid _____ 0.82

EXAMPLE II 100 parts of Polyether A was combined with 75.6 parts of a mixture made up of 75% of the hydrogen sulfide adduct defined in Example I and 25% by weight of 1,3-dithioglycerol. To this mixture was added 0.13 part of benzyldimethyl amine. The resulting composition was then spread as a sheet and cured for 1 hour at 100° C. The resulting cured sheet had the following properties:

Heat distortion point _____ ° C__ 56.5
Flexural strength $10^{-3}$ p.s.i. _____ 16.6
Modulus, $10^{-5}$ p.s.i. _____ 4.15
Tensile strength, ultimate, $10^{-3}$ p.s.i. _____ 6.29
Percent solvent pick-up, 1 month:
    Water _____ 0.92
    Benzene _____ 0.54
10% NaOH _____ 0.69
10% sulfuric acid _____ 0.78

EXAMPLE III 100 parts of a mixture made up of 85 parts Polyether A and 15 parts butyl glycidyl ether was combined with 128 parts of the adduct of hydrogen sulfide and glycidyl ether as defined in Example I. To this mixture was added 0.2 part of benzyldimethylamine. The resulting mixture was spread out as a sheet and cured for 7 days at 25° C. The resulting cured product had the following properties:

Flexural strength, $10^{-3}$ p.s.i. _____ 24.0
Modulus, $10^{-5}$ p.s.i. _____ 3.51
Tensile strength, ultimate, $10^{-3}$ p.s.i. _____ 6.72

EXAMPLE IV 100 parts of Polyether A was combined with 88 parts of a mixture made up of 65% of the hydrogen sulfide adduct defined in Example I and 35% of ethylcyclohexyl dimercaptan. To this mixture was added 0.13 part of benzyldimethyl amine. The resulting composition was then spread as a sheet and cured for 1 hour at 100° C. The properties of the resulting sheet are as follows:

Heat distortion point _____ ° C__ 57.5
Flexural strength, $10^{-3}$ p.s.i. _____ 14.5
Modulus, $10^{-5}$ p.s.i. _____ 4.3
Tensile strength:
    Yield, $10^{-3}$ p.s.i. _____ 9.9
    Percent solvent pick-up, 1 month, water _____ 0.56
10% NaOH _____ .40
10% sulfuric acid _____ .42

EXAMPLE V

This example demonstrates the preparation and properties of clear films from Polyether B and a hydrogen sulfide adduct of a glycidyl ether of phenol-formaldehyde resin.

Two solutions were made up as follows:

Polyether B was combined with a solvent made up of 1:1 mixture of toluene and methyl ethyl ketone. To this was added the hydrogen sulfide adduct defined in Example I, a solvent made up of methyl isobutyl ketone-xylene-Cellosolve, and dimethylaminomethyl phenol.

The formulas used are as follows:

Formula 1:
    Polyether B _____ 100
    Toluene-MEK (1:1) _____ 43
    H$_2$S adduct disclosed in Ex. I _____ 83
    MIBK-xylene-Cellosolve (1:1:1) _____ 60
    Dimethylaminomethyl phenol cured at 77° F. __ 2

Formula 2:
    Polyether B _____ 100
    Toluene-MEK (1:1) _____ 43
    H$_2$S adduct disclosed in Ex. I _____ 88
    Toluene-ethyl acetate (1:1) _____ 60
    Dimethylaminomethyl phenol, cured at 40° F. __ 3

The above mixtures were spread out on tin panels and cured at 77° F. or 40° F. as indicated. The resulting products were hard clear resistant films. Some of the properties are shown in the following table:

|  | Formula 1 77° F. | Formula 2 40° F. |
|---|---|---|
| Set to touch | 10 min | 37 min. |
| Cotton free | 16 min | 44 min. |
| Dry hard | 22 min | 7½ hrs. |
| After 24 hours at 40° F.—Effect of solvents, 15 min.: | | |
| Toluene | | Unchanged. |
| MIBK | | Do. |
| After 7 days: | | |
| Film thickness, mils | 2.5–3.0 | 2.3–1.4. |
| ¼" Mandrel flex test | Passed | Passed. |
| Pencil hardness | 2B | B. |
| Effect of solvents, 15 min.: | | |
| Toluene | Unchanged | Unchanged. |
| MIBK | do | Do. |

EXAMPLE VI

A white enamel was prepared using the following formula:

Polyether C _____ pts__ 100
TiO₂ (Tipure R–610) _____ pts__ 146
60% solution _____ pts__ 2.6
Toluene-MEK as required to reach proper viscosity.

The TiO₂ was ground in Polyether C. More Polyether C, solvent and the SR–2 were added. Before use, the mercaptan and catalyst were added as:

H₂S adduct disclosed in Ex. I, 80%, 58.0 pt., (46.5 pt. solids).
Triethanol amine, 8.5 pt.

This mixture had a pot life of about 16 hours. Films were cast on tin panels with both 3 and 6 mil doctor blades. These were tested after 3 days at room temperature. They had excellent gloss and good impact resistance.

EXAMPLE VII

To show how the mercaptan cured systems adhere to concrete the following coatings were applied to concrete blocks. The blocks were first cast from concrete fine aggregate and cement according to ASTM methods. They were aged in water for 30 days and then cut. The coatings were cast on the cut face with a 6 mil doctor blade.

The formulas used were:

Formula 1:
　　Polyether A _____ 100
　　TiO₂ _____ 100
　　Toluene-MEK (1:1) _____ 25
　　SR–82 _____ 1
　　H₂S adduct disclosed in Ex. I _____ 136
　　Toluene-ethyl acetate _____ 90
　　Tri(dimethylaminoethyl)phenol _____ 1

The TiO₂ was ground in Polyether A and the solvent and SR–82 added. The solution of the H₂S adduct plus the dimethylaminomethyl phenol was added just before spreading the film. The pot life was short and the coating was cured at room temperature in less than 1 hour.

Formula 2:
　　Polyether A _____ 100
　　Coal tar _____ 117
　　H₂S adduct disclosed in Ex. I+dithioglycerol __ 75
　　Tri(dimethylaminomethyl)phenol _____ 1

The coal tar and Polyether A were mixed and the H₂S adduct plus dithioglycerol was added just before spreading the film. The pot life was short and the film was completely cured in less than 1 hour at room temperature.

Formula 3:
　　Polyether A _____ 100
　　H₂S adduct disclosed in Ex. I _____ 118
　　Alkylated naphthalene _____ 64
　　Tri(dimethylaminomethyl) _____ 1

The H₂S adduct, alkylated naphthalenes and dimethylaminomethyl phenol were mixed together in the absence of solvent. This mixture was combined with Polyether A and the mixture spread out as a thick coating on concrete. Sand was sprinkled on top of the coating and the excess brushed off. The system cured in less than one hour. The cured system showed good adhesion to concrete, hardness and resistance to water.

EXAMPLE VIII

The following mixture was prepared and applied as an adhesion to stick old concrete to new concrete.

Parts
Polyether A+15 parts of butyl glycidyl ether ____ 100
H₂S adduct of Ex. I _____ 100
1,3-dithioglycerol _____ 75.6
No catalyst.

This mixture had a pot life of over 12 hours. The old concrete-to-new concrete sample bonded by this adhesive after 2 days, broke at 440 p.s.i. with concrete failure.

EXAMPLE IX

This example illustrates the use of the compositions of the invention as adhesives for aluminum, steel and the like.

The following two formulations were prepared:

Polyether A _____ 100
H₂S adduct of Ex. I+dithioglycerol _____ 75.6
Benzyldimethylamine _____ 0.13
Polyether A+15 parts of butyl glycidyl ether ____ 100
H₂S adduct of Ex. I+dithioglycerol _____ 75.6
Benzyldimethylamine _____ 0.13

These mixtures were applied to cleaned aluminum and steel surfaces and the surfaces pressed together and cured at 100° C. and 25° C. Very good adhesion was obtained.

EXAMPLE X

This example illustrates the properties of a composition prepared from Polyether A, a liquid polythiopolymercaptan of the formula

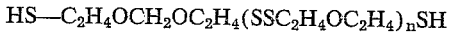

$$HS-C_2H_4OCH_2OC_2H_4(SSC_2H_4OC_2H_4)_nSH$$

having a mol weight of about 3000 and a mercaptan value of 0.2 eq./100 g., and the hydrogen sulfide adduct defined in Example I.

100 parts of Polyether A were combined with 0.93 part of the polythiopolymercaptan and 80 parts of the hydrogen sulfide adduct defined in Example I. This mixture was spread out and used as a coating and as an adhesive for metal. The coating had excellent adhesion and chemical resistance.

EXAMPLE XI

Examples I to X are repeated with the exception that the hydrogen sulfide adduct is replaced with a hydrogen sulfide adduct of tetrakis(4-hydroxyphenyl)ethane. Related results are obtained.

EXAMPLE XII

Examples I to X are repeated with the exception that the adduct is replaced with a hydrogen sulfide adduct of poly(allylglycidyl ether) having a molecular weight of about 1500 obtained by polymerization through the allyl group. Related results are obtained.

EXAMPLE XIII

Example I is repeated with the exception that the Polyether A is replaced with each of the following: diglycidyl ether of resorcinol, epoxidized 2,2-bis(4-cyclohexenyl)propane, epoxidized diallyl phthalate, epoxidized methylcyclohexenylmethyl methylcyclohexenecarboxylate and a glycidyl ether of a phenol-formaldehyde resin which was used in making the hydrogen sulfide adduct. Related results are obtained.

We claim as our invention:

1. A process for converting polyepoxides having more than one vic-epoxy group to products which are insoluble and infusible and have excellent resistance to heat which comprises reacting (1) the polyepoxide having more than one vic-epoxy group with (2) a reaction product of hydrogen sulfide and a polyepoxide having at least three vic-epoxy groups, said polyepoxide having at least three epoxy groups and the hydrogen sulfide being combined in a mole ratio varying from 1:20 to 1:4, the reaction product defined in (2) and the polyepoxide defined in (1) being combined in a chemical equivalent ratio of .8:1.5 to 1.5:.8.

2. A process as in claim 1 wherein the reaction is conducted in the presence of a tertiary amine activator for the epoxy-mercaptan reaction.

3. A process as in claim 1 wherein the recation product defined in (2) is the reaction product of hydrogen sulfide and a glycidyl polyether of a polyhydric phenol having more than 3 glycidyl ether groups.

4. A process as in claim 1 wherein the reaction product defined in (2) is a reaction product of hydrogen sulfide and a glycidyl polyether of a phenol-formaldehyde resin.

5. A process as in claim 1 wherein the recation product defined in (2) is the reaction product of hydrogen sulfide and a glycidyl polyether of tetrakis(4-hydroxyphenyl)alkane.

6. A process as in claim 1 wherein the reaction is conducted in the presence of an alkyl sulfide activator for the epoxy-mercaptan reaction.

7. A process as in claim 1 wherein the reaction is conducted in the presence of an organic phosphine activator for the epoxy-mercaptan reaction.

8. A process as in claim 1 wherein the polyepoxide to be cured and defined in (1) is a glycidyl ether of 2,2-bis(4-hydroxyphenyl)propane.

9. A process as in claim 1 wherein the polyepoxide to be cured and defined in (1) is epoxidized methylcyclohexeneylmethyl methylcyclohexanecarboxylate.

10. A process as in claim 1 wherein the polyepoxide to be cured and defined in (1) is vinylcyclohexene diepoxide.

11. A process as in claim 2 wherein the polyepoxide defined in (1) is vinylcyclohexene diepoxide.

12. A composition capable of being converted to an insoluble infusible product having excellent resistance to heat comprising a mixture of (1) a polyepoxide having more than one vic-epoxy group and (2) a reaction product of hydrogen sulfide and a polyepoxide having at least three vic-epoxy groups, said polyepoxide having at least 3 epoxy groups and the hydrogen sulfide being combined in a mole ratio varying from 1:20 to 1:4, the reaction product defined in (2) and the polyepoxide defined in (1) being combined in a chemical equivalent ratio of .8:1.5 to 1.5:.8.

13. A composition capable of being converted to an insoluble infusible product having excellent resistance to heat comprising a mixture of (1) a polyglycidyl ether of 2,2-bis(4-hydroxyphenyl)propane and (2) a reaction product of hydrogen sulfide and a phenol-formaldehyde glycidyl ether containing at least three glycidyl groups, said phenol-formaldehyde glycidyl ether and the hydrogen sulfide being combined in a mole ratio varying from 1:20 to 1:4, the reaction product defined in (2) and the polyglycidyl ether defined in (1) being combined in a chemical equivalent ratio of .8:1.5 to 1.5:.8.

References Cited
UNITED STATES PATENTS 2,633,458   3/1953   Shokal _____ 260—837

SAMUEL H. BLECH, *Primary Examiner.*

MURRAY TILLMAN, *Examiner.*

P. LIEBERMAN, *Assistant Examiner.*